Feb. 9, 1932.  J. D. WISE  1,844,733

UNIVERSAL CHEEK DISTENDER AND TONGUE DEPRESSOR

Filed Oct. 5, 1929

John D. Wise
INVENTOR

BY Victor J. Evans
ATTORNEY

Patented Feb. 9, 1932

1,844,733

UNITED STATES PATENT OFFICE

JOHN D. WISE, OF JACKSON, TENNESSEE

UNIVERSAL CHEEK DISTENDER AND TONGUE DEPRESSOR

Application filed October 5, 1929. Serial No. 397,647.

This invention relates to dental instruments and is an improvement upon the instrument disclosed in my co-pending application, filed July 24, 1929, and bearing Serial Number 380,593.

Like the invention disclosed in the application mentioned, the present invention has for an object the provision of an instrument which combines with a mouth mirror a cheek distender and tongue depressor, so that all surfaces of the teeth of the patient may be plainly reflected.

The primary object of the present invention is to utilize the loop which forms the combined cheek distender and tongue depressor to hold the mirror rigidly connected with the handle, so that pressure upon the mirror while the latter is in use, will not move the mirror independently of the handle.

Another object of the invention is the provision of means of the above character which will also permit of the ready removal and replacement of the mirror, so that the mirror may be quickly and conveniently changed.

Another object of the invention is to simplify and improve the construction of the instrument so that the instrument may be more readily kept in sterile and sanitary condition.

With the above and other objects in view, the invention further includes the following novel features and details of construction, to be hereinafter more fully described, illustrated in the accompanying drawings and pointed out in the appended claim.

In the drawings:—

Figure 1:
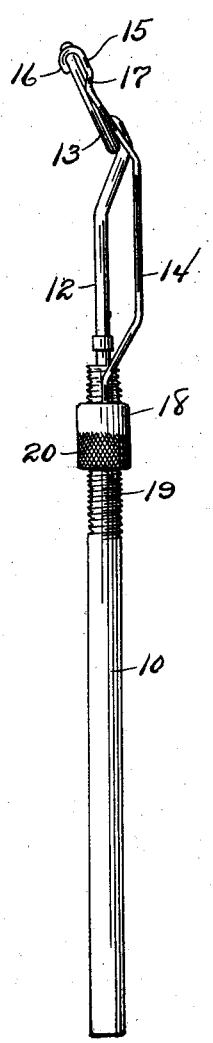
Figure 1 is an edge view of a dental instrument constructed in accordance with the invention.

Referring to the drawings in detail wherein like characters of reference denote corresponding parts, the reference character 10 indicates a handle which may be of suitable size and shape and which is provided at one end with a socket 11. This socket is adapted to removably receive the end of the stem or shank 12 of a mouth mirror 13, so that the handle may be utilized with mirrors whose stems or shanks vary.

Figure 2:
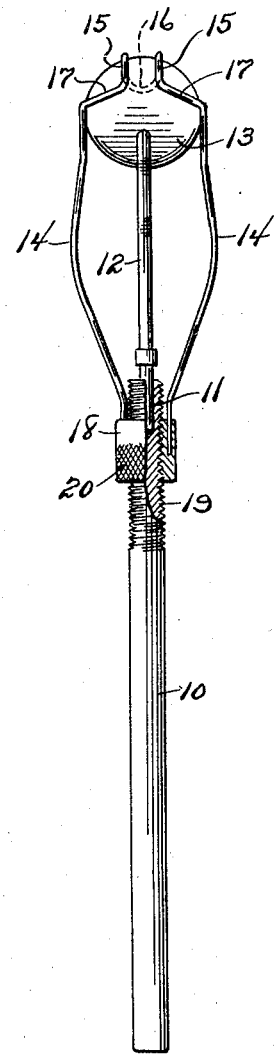
Figure 2 is a view at right angles to Figure 1 with parts broken away and shown in section.

The combined cheek distender and tongue depressor embodies a loop and this loop is formed of bars 14 which are located upon opposite sides of the stem or shank 12 and opposite sides of the handle. As shown in Figure 1 of the drawings, these bars are offset at their intermediate portions and are outwardly bowed or curved as shown in Figure 2. The outer ends of the bars are connected by relatively narrow loop 15 whose extremity 16 is hook-shaped so as to engage over the end of the mirror. Oppositely and outwardly extending inclined portions 17 connect the bars with the loop 15 and engage the back of the mirror so that the latter will be clamped between these portions 17 and the hook-shaped extremity 16.

The inner ends of the bars 14 are secured to a collar 18 and this collar is interiorly threaded so as to engage threads 19 provided upon the periphery of the handle 10. The collar is knurled as shown at 20 so as to provide adequate gripping means.

As shown in the drawings, the mirror is clamped within the outer end of the cheek distender and tongue depressor loop and is thereby held against accidental movement with respect to the handle. However, by holding the collar 18 and rotating the handle 10, or vice-versa, the collar and handle will be moved relatively to release the mirror. The threads 19 may be of sufficient length to provide proper adjustment of the collar so as to accommodate mirrors for stems or shanks of different lengths.

By threadedly mounting the inner end of the loop upon the handle 10, relative adjustment of the bars 14 may be made. In other words, by rotating the handle with respect to the loop, the bars 14 may be moved relatively inward or outward, so as to retract or expand the cheek distender.

The invention is susceptible of various changes in its form, proportions and minor details of construction and the right is herein reserved to make such changes as properly fall within the scope of the appended claim.

Having described the invention, what is claimed is:—

In a dental instrument, a handle exteriorly threaded at one end and having a socket in said end, a mirror having a shank removably received in the socket, the collar threadedly adjustable upon the shank, and a combined cheek distender and tongue depressor carried by the collar and engaging the mirror.

In testimony whereof I affix my signature.

JOHN D. WISE.